(12) United States Patent
Romeo

(10) Patent No.: US 6,276,721 B1
(45) Date of Patent: Aug. 21, 2001

(54) PIVOTING SEAT BELT UPPER ANCHOR POINT ATTACHMENT

(75) Inventor: David Joseph Romeo, Etna, WY (US)

(73) Assignee: Simula, Inc., Phoenix, AZ (US)

( * ) Notice: Subject to any disclaimer, the term of this patent is extended or adjusted under 35 U.S.C. 154(b) by 0 days.

(21) Appl. No.: 09/525,033

(22) Filed: Mar. 14, 2000

(51) Int. Cl.⁷ .............................. B60R 22/24; B60R 22/26
(52) U.S. Cl. ...................... 280/808; 280/801.2; 280/802; 280/805; 280/807; 280/483
(58) Field of Search ............... 280/801.1, 801.2, 280/802, 806, 803, 804, 805, 807, 808; 297/470, 471, 472, 469, 483

(56) References Cited

U.S. PATENT DOCUMENTS

| | | | |
|---|---|---|---|
| 3,838,870 | * 10/1974 | Hug | 297/472 |
| 4,549,770 | * 10/1985 | Kurtti | 297/479 |
| 4,958,854 | * 9/1990 | Haland | 280/806 |
| 5,681,081 | * 10/1997 | Lindner et al. | 297/216.13 |
| 5,743,597 | * 4/1998 | Jessup et al. | 280/801.2 |
| 5,749,601 | * 5/1998 | Knoll | 280/805 |
| 5,823,627 | * 10/1998 | Viano | 297/471 |

FOREIGN PATENT DOCUMENTS

3837170-A1 * 5/1990 (DE) .

* cited by examiner

Primary Examiner—Lanna Mai
Assistant Examiner—Ruth Ilan
(74) Attorney, Agent, or Firm—Shaw Pittman

(57) ABSTRACT

A three-point passenger restraint system for a passenger seat including a lap belt having a first end connected to a lap belt retractor and a second end. A torso belt having a first end connected to the second end of the lap belt and a second end. The second end of the torso belt is attached to an anchor arm that is pivotally mounted to a passenger seat or vehicle side structure, wherein the anchor arm is rotationally biased to remove slack in the torso belt. The anchor arm rotates and thus functions (i) as the upper height adjusting anchor point for the three-point restraining system and (ii) to adjust belt length to comfortably accommodate passenger sizes in the range of a $5^{th}$ percentile female to a $95^{th}$ percentile male.

24 Claims, 5 Drawing Sheets

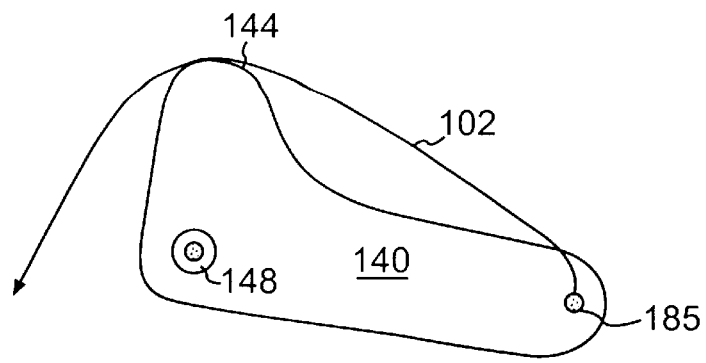
FIG. 2A
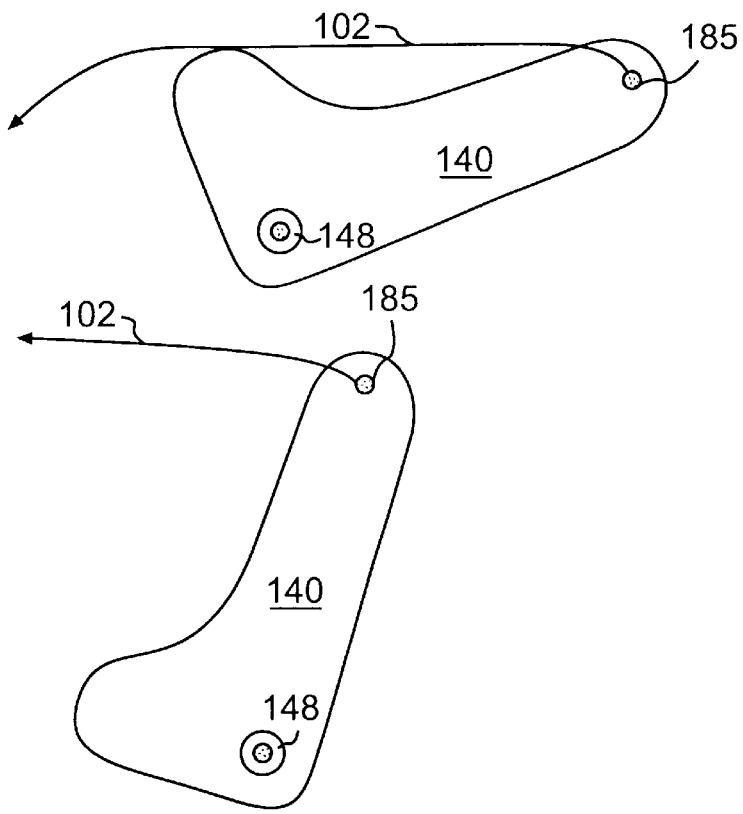
FIG. 2B
FIG. 2C
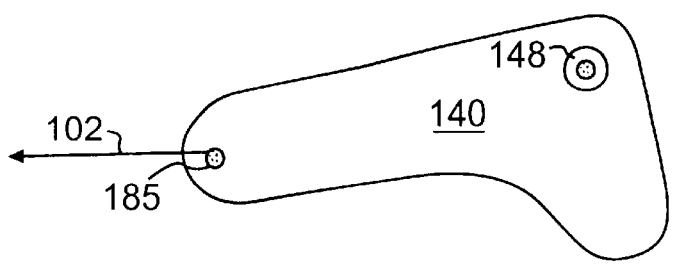
FIG. 2D

PIVOTING SEAT BELT UPPER ANCHOR POINT ATTACHMENT

BACKGROUND

1. Field of the Invention

The present invention is directed to vehicle occupant restraint systems, and specifically to a pivoting arm that operates as a seat belt upper anchor point.

2. Background of the Invention

An occupant restraint system in a vehicle such as an automobile, truck, van, helicopter, airplane or any other self-propelled vehicle is an expensive component, yet critical for safety. A popular restraint system is the three-point system including a lap belt secured at a first and second point and a torso belt secured at the second and a third point. The first point, in many designs, comprises a lap belt inertial retractor that removes slack from the lap belt and locks-up upon a sudden stop.

The second point typically is a tongue and buckle arrangement wherein the buckle is secured to the side of a seat opposite the inertial lap belt retractor and the tongue can be secured to and released from the buckle. Respective ends of the lap belt and torso belt are either secured to the tongue in a fixed tongue arrangement or, in a sliding tongue arrangement, the lap belt and torso belt comprise a continuous belt that can slide through an opening in the tongue. The third point in a three-point system typically includes an inertial retractor located in the lower portion of a B-pillar (in the case of an automobile, for example) and the torso belt passes through a D-ring typically attached to an upper part of the B-pillar. In some more recent designs, the torso belt retractor and D-ring are attached to the seat frame.

Many recent restraining system designs provide for a vertically slideable D-ring (height adjuster) to accommodate passengers of varying size in addition to the one or both inertial retractors used to supply or take-up the appropriate amount of torso belt length to accommodate a specific individual. In any event, the constant sliding motion of the torso belt through this D-ring leads to undesirable wear on the torso belt itself, thereby decreasing the torso belt's ultimate strength and presenting undesirable appearance. Furthermore, in a fixed tongue arrangement, it is expensive to have two inertial retractors. Further still, a manual or motor driven D-ring height adjuster is expensive.

SUMMARY OF THE INVENTION

The present invention improves upon prior art three-point passenger restraint systems by eliminating the need for a D-ring, particularly an expensive manual or motor driven D-ring height adjuster, and torso belt inertial retractor, while comfortably accommodating passengers of varying size within the confines of a torso belt.

The present invention provides an upper anchor arm having two ends. A first end is pivotally mounted on the side of the seat back or vehicle side structure. The upper end of the torso belt is securely fastened to the second end of the anchor arm. Preferably the anchor arm is rotationally biased such that slack in the torso belt is removed. At the same time, the anchor arm is capable of rotating in a direction opposite to a direction that removes slack such that the upper end of the torso belt is comfortably positioned over an occupant's shoulder regardless of occupant height.

The anchor arm in accordance with various embodiments of the present invention can have two legs arranged at about 90 degrees with respect to each other, can be shaped eccentrically or can have a substantially rectangular shape.

In all embodiments, the anchor arm preferably is capable of pivoting to comfortably accommodate an occupant having a size at least within the range of a $5^{th}$ percentile female to a $95^{th}$ percentile male. This is achieved by anchor arm rotation around a pivot point. Further, the anchor arm preferably pivots sufficiently rearward to include a "park" position wherein the torso belt is substantially stored when the seat is unoccupied, and a "comfort" position wherein the torso belt can be brought forward with a seated passenger when the passenger moves or reaches forward such that it does not constrict upper torso motion of the passenger, thereby allowing normal motion and comfort.

It is therefore an object of the present invention to provide an improved three-point restraining system for a vehicle.

It is also an object of the present invention to provide a pivotally mounted anchor arm that operates as the height adjustable upper anchor point for a torso belt in a three-point restraining system.

It is also an object of the present invention to comfortably accommodate a wide range of passengers without the necessity of a torso belt retractor.

It is still further an object of the present invention to provide an improved passenger restraint system wherein a D-ring assembly is replaced by a self-adjusting (for occupant size, height and comfort) attachment assembly.

These and other objects of the present invention will become apparent upon a reading of the detailed description in conjunction with the accompanying drawings.

BRIEF DESCRIPTION OF THE DRAWINGS

FIGS. 2A–2D is a diagram illustrating the range of motion of the first preferred embodiment of the present invention.

DETAILED DESCRIPTION OF THE INVENTION

Figure 1:
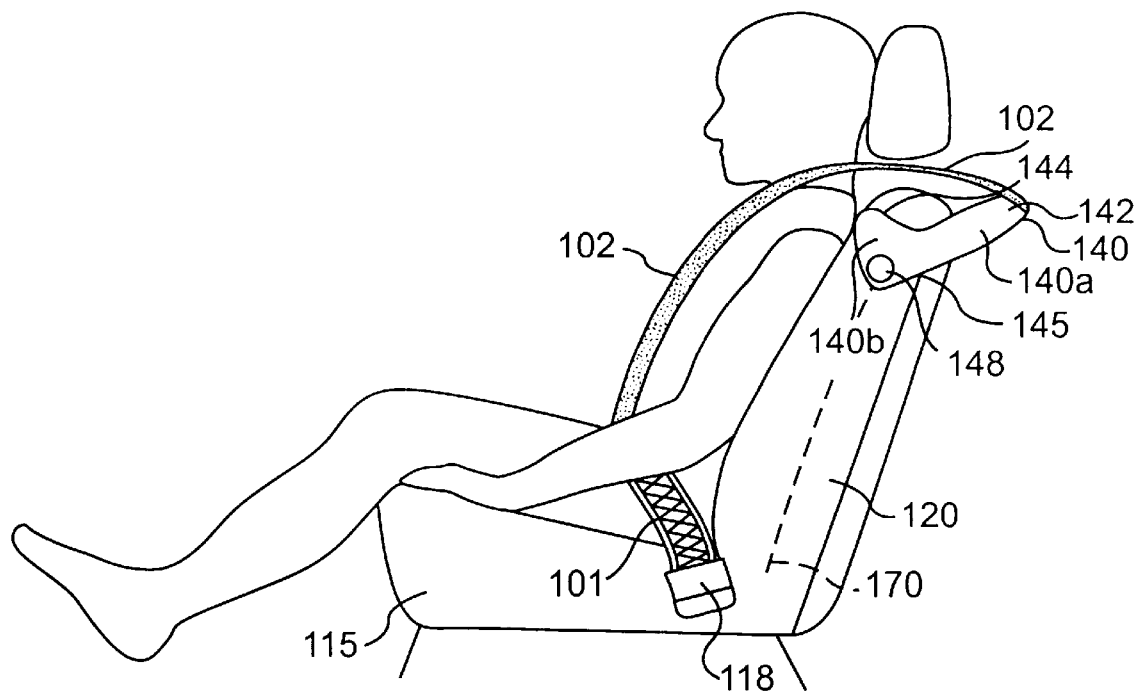
FIG. 1 is a schematic diagram illustrating a first preferred embodiment of the present invention.

FIG. 1 is a schematic diagram illustrating a first preferred embodiment of the present invention. Seat pan 115 and seat back 120 comprise a typical driver occupant left side seat in an automobile, or any other vehicle where it is desirable that an occupant is restrained in the event of a sudden stop or crash. A passenger is secured to seat pan 115 and seat back 120 by means of lap belt 101 and torso belt 102. Lap belt retractor 118 operates to eliminate slack in lap belt 101 and, where the tongue (not shown) of lap belt 101 is a slip-type tongue, may also help to eliminate slack in torso belt 102. Lap belt retractor 118 preferably is an inertial type retractor which locks-up in the event of a sudden stop or crash. Inertial type retractors are well known in the art.

The first preferred embodiment of the present invention is shown on the upper right hand side of FIG. 1. As shown, torso belt 102 is attached at its upper end at point 185 to anchor arm 140, which preferably has two legs 140a, 140b. These legs preferably are arranged at about a 90 degree angle with respect to each other. However, other angles between legs 140a, 140b, either acute or obtuse, may also be implemented. Specifically, acute angles down to about 45 degrees and obtuse angles up to 180 degrees are intended to be within the scope of the present invention.

Anchor arm 140 preferably also includes a surface 144 over which torso belt 102 comes in contact at least under certain anchor arm positions, as will be explained in more detail below.

Anchor arm 140 preferably is pivotally mounted at pivot point 148 to seat back 120 at seat side opening 145 on the side of seat back 120. A secure pivotal mounting is important at this connection point as the other end of anchor arm 140, namely point 185 on leg 140a, serves as the upper anchor point for torso belt 102. Accordingly, anchor arm 140 preferably is fabricated from a strong material such as steel or composite material. To achieve the necessary sturdiness, mounting of anchor arm 140 is preferably effected by a mechanical bushing, bearing, axle or load bearing hinge or pivot capable of transferring occupant crash loads into the seat frame or vehicle structure. Preferably, in the event of a vehicle crash, the pivoting mechanism will lock-up in the same manner as a typical seat belt retractor. Further, the material chosen for anchor arm 140 preferably has force limiting capabilities such that after a certain level of stress, anchor arm 140 bends or twists thereby alleviating undue restraint force to a seat occupant. Occupant force limiting can also be integrated into the pivot.

Further, anchor arm 140 preferably is spring loaded (e.g., spring 200, FIG. 4B) or is otherwise continuously biased in a clockwise direction around pivot point 148. Of course, for a right hand seat, the biasing would be in the counterclockwise direction. Various mechanisms for achieving the desired biasing are well known to those skilled in the art and thus will not be described herein. However, mechanisms consistent with those commonly used in seat belt retractor design, i.e. coil springs, torsion bars, are preferably used in conjunction with the present invention.

In accordance with the present invention, anchor arm 140 functions as the automatic height adjustable upper anchor point for a three-point passenger restraint system and is particularly well-suited to operate with a fixed length torso belt 102. That is, in accordance with the present invention, because anchor arm 140 is continually rotationally biased (clockwise for right hand seat), any slack existing in torso belt 102 is taken up by the pivoting action of anchor arm 140 and occupant height adjustment is provided. Thus, anchor arm 140, implemented as described above, eliminates the need for a torso belt retractor as well as a height adjuster which are common in three-point passenger restraint systems, and which are generally required with fixed length torso belts and/or fixed tongue restraint systems. Thus, the present invention eliminates two relatively expensive components (torso belt retractor and height adjuster) and, accordingly, results in an overall less expensive occupant restraint system.

Pivoting anchor arm 140 preferably includes an inertial stopping mechanism which halts counterclockwise rotation (for a left hand seat) in the event of a sudden stop or crash. Such inertial stopping mechanisms are well-known to those skilled in the art. These inertial stopping mechanisms might also provide force limiting function by permitting movement after a threshold amount of force has been applied. Such force limiting could be used alone or in combination with the materials-based force limiting functionality described above.

Figure 4A:
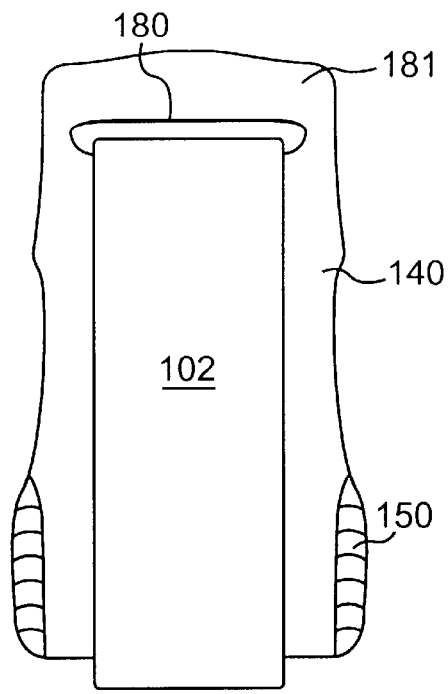
FIGS. 4A and 4B illustrate a preferred configuration for an anchor arm/torso belt interface in accordance with the present invention.

Because of the rotating nature of anchor arm 140, torso belt 102 may contact surface 144 in varying degrees particularly as the arm travels to park position. To ensure that torso belt 102 remains in the proper position, at least a portion of surface 144 may be bounded by protrusions 150 that run along the edges of leg 140b and leg 140a (FIG. 4A). Protrusions 150 preferably are on the order of 1–10 mm high and function to keep torso belt 102 within a "groove."

Pivoting anchor arm 140 preferably has a range of motion that can comfortably accommodate persons of various sizes and, more preferably, passenger sizes ranging from a $5^{th}$ percentile female to a $95^{th}$ percentile male. Further, the range of motion preferably also includes a "park" position and a "comfort" position that are located, respectively, beyond anchor arm positions that accommodate the $5^{th}$ and $95^{th}$ percentile passengers.

FIGS. 2A–2D illustrate the preferred full range of motion of anchor arm 140. As shown, in the "park" position (FIG. 2A) anchor arm 140 is rotated fully clockwise around pivot point 148. Depending on the thickness of seat back 120, leg 140a of anchor arm 140 may extend beyond the back surface of seat back 120 (see FIG. 1). However, in the majority of other possible positions, leg 140a preferably is forward of this surface.

Anchor arm 140 is capable of rotating counterclockwise continuously through positions that accommodate both in length and in height a 5th percentile female through a 95th percentile male and preferably is fully stopped at a "comfort" position (FIG. 2D) which allows a passenger the comfort and ease to move or reach forward in their seat even with the correctly adjusted torso belt in place. FIGS. 2B and 2C illustrate $5^{th}$ and $95^{th}$ percentile rotational positions, respectively.

Table 1 below lists preferred torso belt length variance dimensions in selected cases in accordance with the first embodiment of the present invention. Of course, these dimensions are provided as examples only and may vary depending on seat design, and sizes of legs 140a and 140b. In a preferred embodiment, pivot point 148 and the end of leg 140a when in the position corresponding to the $95^{th}$ percentile position are aligned substantially with a longitudinal center line 170 of seat back 120, e.g., within 10 degrees of center line 170.

TABLE 1

| Length Reference No. | Location Pair | Length (mm) |
| --- | --- | --- |
| A | Park to $5^{th}$ | 100 |
| B | $5^{th}$ to $95^{th}$ | 175 |
| C | $50^{th}$ to Comfort | 300 |
| D | 95 to Comfort | 175 |
| E | $5^{th}$ to $50^{th}$ | 50 |
| F | Park to $50^{th}$ | 150 |
| G | Park to Comfort | 450 |
| H | Park to $95^{th}$ | 275 |

Figure 3:
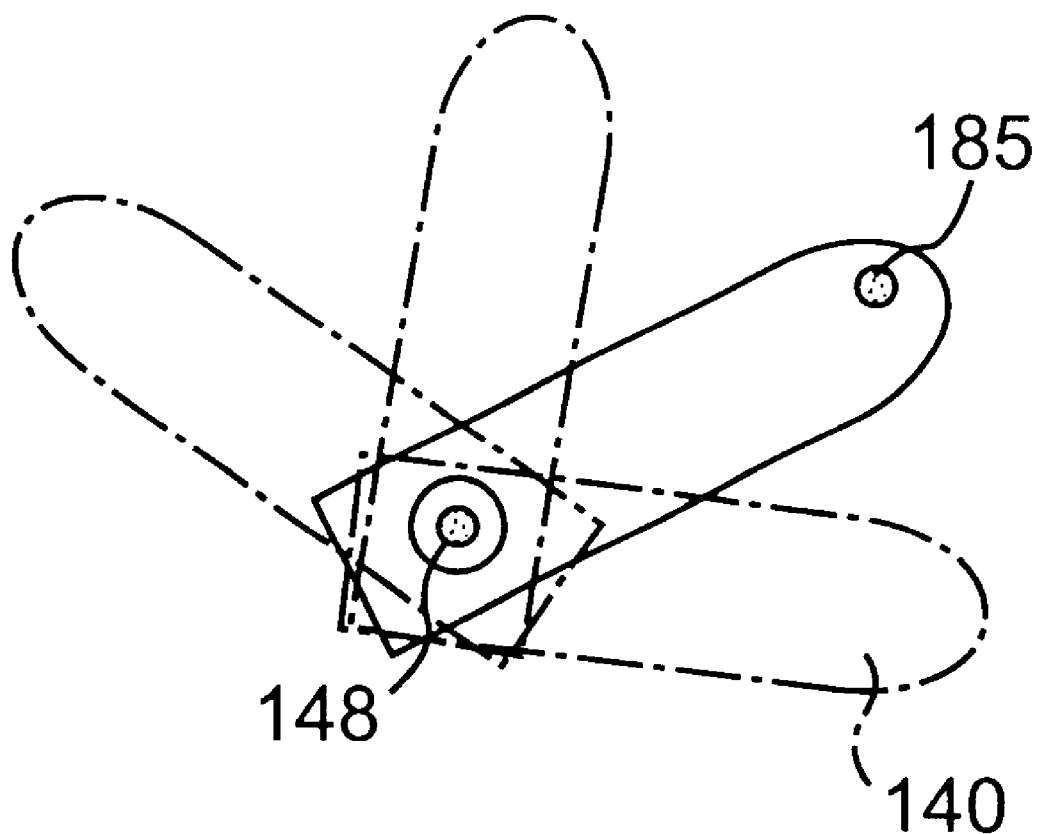
FIG. 3 is a diagram illustrating a second preferred embodiment of the present invention.

FIG. 3 illustrates a second preferred embodiment of the present invention. In this case, anchor arm 140 has a generally elongate substantially rectangular shape without separate legs. Pivot point 148 is located at a first end and the torso belt anchor point is located at a second end. This relatively simpler anchor arm shape may be more suited to certain vehicle classes and/or seat configurations. Further, the simpler shape is less expensive to manufacture. However, this configuration may result in some reduction in belt take-up in the park position as compared to the first embodiment described herein.

The second embodiment of the present invention preferably also includes the features of biased pivoting, lock-up and force limiting as described with respect to the first embodiment.

Figure 4B:
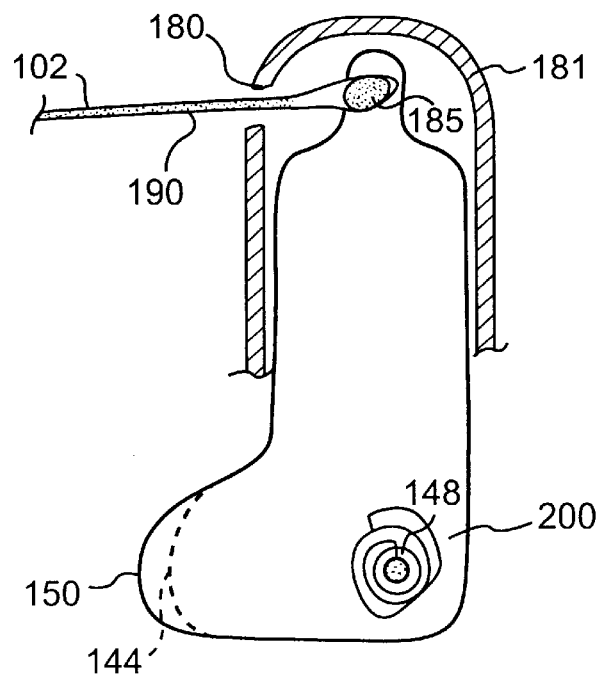

FIGS. 4A and 4B illustrate a preferred configuration for an anchor arm/torso belt interface in accordance with the present invention. This aspect of the present invention is described with reference to the first embodiment shown in FIG. 1, but is applicable to the second embodiment as well, Preferably, torso belt 102 passes through a cover opening 180 of cover 181 which cosmetically encompasses leg 140a of anchor arm 140. Then, as shown in detail in FIG. 4B, torso belt 102 preferably is wrapped around anchor pin 185, which is itself structurally secured to leg 140a and accessible via opening 180. Torso belt 102 preferably is sewn together at region 190 to secure the belt so that effectively functions as an upper anchor point in accordance with the present invention.

In an alternative embodiment (not shown) the position of anchor arm 140 is controlled by an electric motor. The motor may be controlled directly via a switch operable by a passenger or a memory may be employed to store desired anchor arm positions and automatically position the anchor arm when the particular passenger is identified by, e.g., weight.

Figure 5:
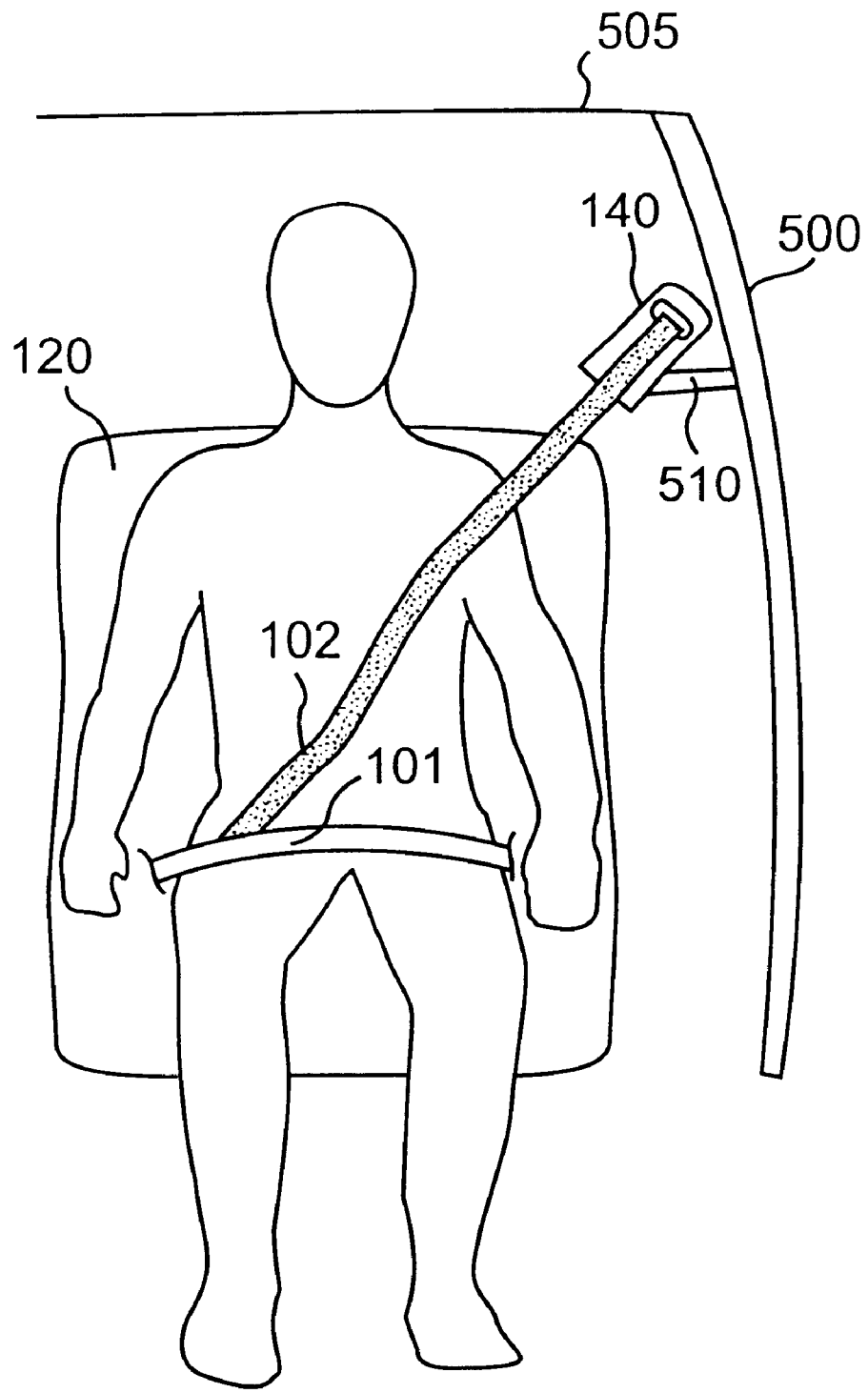
FIG. 5 is a schematic diagram of still another embodiment of the present invention.

In still another embodiment of the present invention, anchor arm 140 is mounted to a side structure of the vehicle, as shown in FIG. 5. Anchor arm 140 preferably is mounted to a vehicle side structure 500, which supports, for example, the vehicle's roof 505 and door (not shown). Anchor arm 140 preferably is mounted on a support 510. As shown, anchor arm 140 may be mounted on an angle such that the axis of rotation of the anchor arm is substantially perpendicular to a longitudinal dimension of the torso belt.

Thus, it is readily appreciated that the present invention provides an improved occupant restraint system by, among other things, eliminating a conventional torso belt retractor and D-ring height adjusting assembly while still providing safety and comfortable accommodation for passengers of various sizes within a restraining system having a torso belt.

The foregoing disclosure of embodiments of the present invention and specific examples illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. For example, it might be desirable to incorporate the mechanical or motor driven conventional height adjuster with the pivot anchor arm of the present invention to provide height adjustment and forward comfort reach enablement and still be able to eliminate the torso belt retractor. The scope of the invention is to be defined only by the claims appended hereto, and by their equivalents.

What is claimed is:

1. A three-point passenger restraint system for a passenger seat, comprising:
    a lap belt having a first end and second end, the first end of the lap belt being connected to a lap belt retractor;
    a torso belt having a first end and a second end, the first end of the torso belt being connected to the second end of the lap belt; and
    an anchor arm pivotally mounted to one of the passenger seat and a side structure of a vehicle, the second end of the torso belt being attached to the anchor arm,
    wherein the anchor arm is rotationally biased to remove slack in the torso belt and has a range of motion, in a non-crash state, to accommodate passengers in a size and height range of a $5^{th}$ percentile female to a $95^{th}$ percentile male.

2. The passenger restraint system of claim 1, wherein the anchor arm comprises two legs.

3. The passenger restraint system of claim 2, wherein the anchor arm is pivotally mounted at the junction of the two legs and the torso belt is attached to an end of one of the two legs.

4. The passenger restraint system of claim 1, wherein the second end of the torso belt is attached to the anchor arm via a pin.

5. The passenger restraint system of claim 1, wherein the anchor arm comprises a surface upon which the torso belt rests in at least one rotational position of the anchor arm.

6. The passenger restraint system of claim 1, wherein the anchor arm is further rotatable backward and forward to, respectively, park and comfort positions.

7. The anchor arm of claim 1, wherein the anchor arm provides torso belt height adjustment.

8. The anchor arm of claim 1, wherein the anchor arm operates to retract the torso belt.

9. The passenger restraint system of claim 1, wherein the anchor arm is an eccentric anchor arm.

10. A restraint system for a passenger seat of a vehicle, comprising:
    a torso belt anchor arm pivotally mounted to one of a side of a passenger seat and a side structure of a vehicle, the anchor arm being operable as an upper anchor point for the torso belt and having a surface that contacts the torso belt, the torso belt being positioned on the surface between protrusions;
    means for rotatatively biasing the anchor arm in a direction whereby slack in the torso belt is reduced, wherein the anchor arm has a range of motion, in a non-crash state, to accommodate passengers in a size and height range of a $5^{th}$ percentile female to a $95^{th}$ percentile male; and
    a lap belt integrated with the torso belt.

11. The restraint system of claim 10, wherein one end of the lap belt is connected to an inertial retractor.

12. The restraint system of claim 10, wherein the anchor arm comprises two legs.

13. The restraint system of claim 10, wherein the anchor arm is one of eccentric and substantially rectangular.

14. The restraint system of claim 10, wherein the torso belt is attached to the anchor arm using a pin.

15. A restraint system for a passenger seat having a seat pan and a seat back, comprising:
    a lap belt and a torso belt, the lap belt being secured on one end thereof to the seat back;
    an anchor arm, wherein one end of the torso belt is secured to the anchor arm, the anchor arm is pivotally mounted on one of a side surface of the seat back and a side structure of a vehicle
    wherein the anchor arm is rotationally biased to remove slack from the torso belt under non-crash conditions and the anchor arm has a range of motion under non-crash conditions to accommodate passengers having different sizes and heights, and wherein the anchor arm is operable as an upper anchor point for the torso belt.

16. The restraint system of claim 15, wherein the anchor arm is capable of positioning the torso belt to accommodate in belt length and occupant height a passenger size in the range of a $5^{th}$ percentile female to a $95^{th}$ percentile male.

17. The restraint system of claim 16, wherein when the anchor arm is in a position to accommodate a $95^{th}$ percentile male, a pivot point of the anchor arm and an end of the torso belt that is secured to the anchor arm are substantially in line with a center line of the seat back.

18. The restraint system of claim 15, wherein the anchor arm comprises two legs.

19. The restraint system of claim is 15, wherein the anchor arm is rotationally biased in one of a clockwise and a counterclockwise direction.

20. The restraint system of claim 15, further comprising force limiting properties.

21. An anchor arm for a torso belt of a passenger restraint system, comprising:

a first leg, the first leg providing torso belt guidance via a contact surface on which the torso belt can rest, the contact surface being bound by protrusions; and a second leg having means for securing one end of the torso belt, wherein the anchor arm is pivotally mounted and rotationally biased to remove slack from the torso belt under non-crash conditions and the anchor arm has a range of motion under non-crash conditions to accommodate passengers having different sizes and heights, and wherein the anchor arm is operable as an upper anchor point for the torso belt.

22. The anchor arm of claim 21, wherein the first and second legs are arranged about 90 degrees with respect to each other.

23. The anchor arm of claim 21, wherein the second leg comprises an opening through which a torso belt can pass through.

24. The anchor arm of claim 21, wherein the means for securing one end of the torso belt comprises a pin.

* * * * *

UNITED STATES PATENT AND TRADEMARK OFFICE
CERTIFICATE OF CORRECTION

PATENT NO.   : 6,276,721 B1
DATED        : August 21, 2001
INVENTOR(S)  : David Joseph Romeo It is certified that error appears in the above-identified patent and that said Letters Patent is hereby corrected as shown below:

Column 2,
Line 63, after "upper end" insert -- 142 --

Column 3,
Line 44, "right hand seat" should read -- left hand seat --

Signed and Sealed this

Fifth Day of March, 2002

*Attest:*

JAMES E. ROGAN
*Director of the United States Patent and Trademark Office*

*Attesting Officer*